United States Patent [19]

Schaefer et al.

[11] Patent Number: 5,648,052

[45] Date of Patent: Jul. 15, 1997

[54] LIQUID MONOPROPELLANT GAS GENERATOR

[75] Inventors: Keith James Schaefer, Nassau, N.Y.; John Mandzy, Pittsfield, Mass.; Andrew Anthony Carlson, North Tonawanda, N.Y.; Crestus Lee Adams, Gaithersburg, Md.; Steven Joseph Brown, Pittsfield; John Joseph Paul Johnson, Lee, both of Mass.

[73] Assignee: Martin Marietta Corporation, Bethesda, Md.

[21] Appl. No.: 452,901

[22] Filed: May 30, 1995

[51] Int. Cl.⁶ ........................................ B01J 7/00
[52] U.S. Cl. .................... 422/305; 422/165; 280/736; 280/737
[58] Field of Search ........................ 422/111, 112, 422/113, 129, 202, 305, 306, 120, 165; 280/736–737

[56] References Cited

U.S. PATENT DOCUMENTS

| | | | |
|---|---|---|---|
| 3,667,216 | 6/1972 | DeMattia et al. | 422/112 |
| 3,672,839 | 6/1972 | Moore | 422/240 |
| 4,069,664 | 1/1978 | Ellion et al. | 422/191 |
| 4,164,890 | 8/1979 | Elmore | 89/185 |
| 4,497,632 | 2/1985 | Galbraith | 441/30 |
| 4,590,860 | 5/1986 | Kromrey | 102/289 |
| 4,805,399 | 2/1989 | McKevitt | 60/200 |
| 4,817,377 | 4/1989 | Kirschner, Jr. | 60/225 |
| 4,856,271 | 8/1989 | Burke | 60/39.02 |
| 5,004,586 | 4/1991 | Hayashi et al. | 422/164 |
| 5,330,730 | 7/1994 | Brede et al. | 422/305 |

*Primary Examiner*—Robert J. Warden
*Assistant Examiner*—Hien Tran
*Attorney, Agent, or Firm*—Finnegan, Henderson, Farabow, Garrett & Dunner, L.L.P.

[57] ABSTRACT

A continuous flow-rate gas generator fueled by liquid monopropellant includes a propellant storage tank, a motor-driven pump (or other pressurization technique) to force the propellant into a combustion chamber having an enclosed volume, an injector to effectively break up the incoming liquid propellant into droplets that facilitate ignition and sustain combustion, an igniter to initiate the combustion process, a nozzle to expand the exhaust gases in order to optimize the pressure and temperature of the working fluid, and exhaust ducting to direct the flow and handle the further heat transfer requirements. If desired, the output may be varied through two mechanisms: either by including an exit gas valve used to vary the exit gas flow to match delivery needs; or by having a plurality of continuous gas generators connected in parallel to a manifold assembly and relying on the combination of mixed flow-rates to match a required gas output.

16 Claims, 3 Drawing Sheets

LIQUID MONOPROPELLANT GAS GENERATOR

BACKGROUND OF THE INVENTION

This invention relates generally to a gas generation system and, more particularly, to a gas generator utilizing liquid monopropellants, such as hydroxyl ammonium nitrate based liquid monopropellants and the like, as a combined oxidizer/fuel source where the generator may have a constant-output or a variable-output, depending on its intended application.

Over the past several decades there has been strong interest in liquid propellant technology, generally for use in propelling munitions. For example, U.S. Pat. No. 4,745,841, entitled "Liquid Propellant Gun", to Magoon et al, teaches a propellant gun wherein the mass rate of flow of liquid propellant can be repetitively, selectively and continuously varied throughout the interval of time of firing a single shot. This patent and all references cited therein are hereby incorporated in their entirety by reference. There are a number of energetic liquids which could be used for propelling munitions. For example, hydrazine and hydrogen peroxide are readily available. Hydrazine, however, is extremely toxic and requires stringent safeguards for human safety, while hydrogen peroxide, in concentrations of practical interest, is inherently unstable and is a severe fire hazard.

Liquid propellants are useful because copious amounts of gas are generated as the propellants burn and propel the munitions out from the gun barrel. Although large amounts of gas are produced, the reaction is an extremely short lived phenomenon, i.e., on the order of 10–20 milliseconds, and therefore liquid propellants have been heretofore limited in their applications. However, some applications need a substantial volume of gas delivered at a specified pressure over a given length of time, such as for the starting of rotating machinery (e.g., diesel engines and gas turbines), inflation of gas bags (e.g., deep sea salvage inflation devices and automotive air bags), and steady-state operation of turbine-driven machinery.

There are currently other methods available for such applications, but these other methods present undesirable properties. Charged flasks of high pressure gas, for example, can be stored and used to initiate rotation of diesel engines, but these flasks are very bulky, have a finite pressure life and require a heavy and complex compressor for recharging. Another method is to combust gases to generate a subsequent high-temperature gas which fills the flasks. However this method is almost never used for this purpose because of the bulk associated with housing large amounts of gas and the safety of carrying a flammable gas. By far, the most prevalent energy source for voluminous gas generation involves the combustion of solid propellants. Although solid propellants are simple, and produce large amounts of gas, such propellant systems lack flexibility, must be replaced after each use, and their combustion products frequently contain undesirable components. Also, once the ignition process is started, it typically cannot be stopped until all of the propellant is consumed. Systems employing liquids, on the other hand, are quite flexible in that they can be readily started, throttled, stopped, and refilled after use.

OBJECTS OF THE INVENTION

A primary object of the present invention is to provide a continuous flow-rate gas generator utilizing a liquid monopropellant, such as hydroxyl ammonium nitrate based liquid monopropellants and the like, as a combined oxidizer/fuel source.

Another object of the present invention is to provide a variable-output flow-rate gas generator utilizing a liquid monopropellant, such as hydroxyl ammonium nitrate based liquid monopropellants and the like, as a combined oxidizer/fuel source.

SUMMARY OF THE INVENTION

Briefly, in accordance with a first aspect of the present invention, a continuous flow-rate gas generator fueled by liquid propellant is provided. The generator comprises a propellant storage tank, a motor-driven pump (or other pressurization technique) to force the propellant into a combustion chamber, an injector to effectively break up the incoming liquid propellant into droplets that facilitate ignition and sustain combustion, an igniter to initiate the combustion process, a nozzle to expand the exhaust gases in order to optimize the pressure and temperature of the exhaust gases, and exhaust ducting to direct the flow and handle further heat transfer requirements. In one presently preferred embodiment, the generator has a constant flow-rate, steady-state output and may be water cooled.

In accordance with a second aspect of the present invention, a variable-output liquid propellant gas generator is provided either by including an exit gas valve to vary the exit gas flow-rate to match delivery needs, or by having a plurality of continuous gas generators connected in parallel to a manifold assembly and using the combination of mixed flow rates to match a required gas output.

BRIEF DESCRIPTION OF THE DRAWINGS

The subject matter which is regarded as the invention is particularly pointed out and distinctly claimed in the concluding portion of the specification.

The invention, together with further objects and advantages thereof, may best be understood by reference to the following description taken in connection with the accompanying drawings in which.

DETAILED DESCRIPTION

Figure 1:
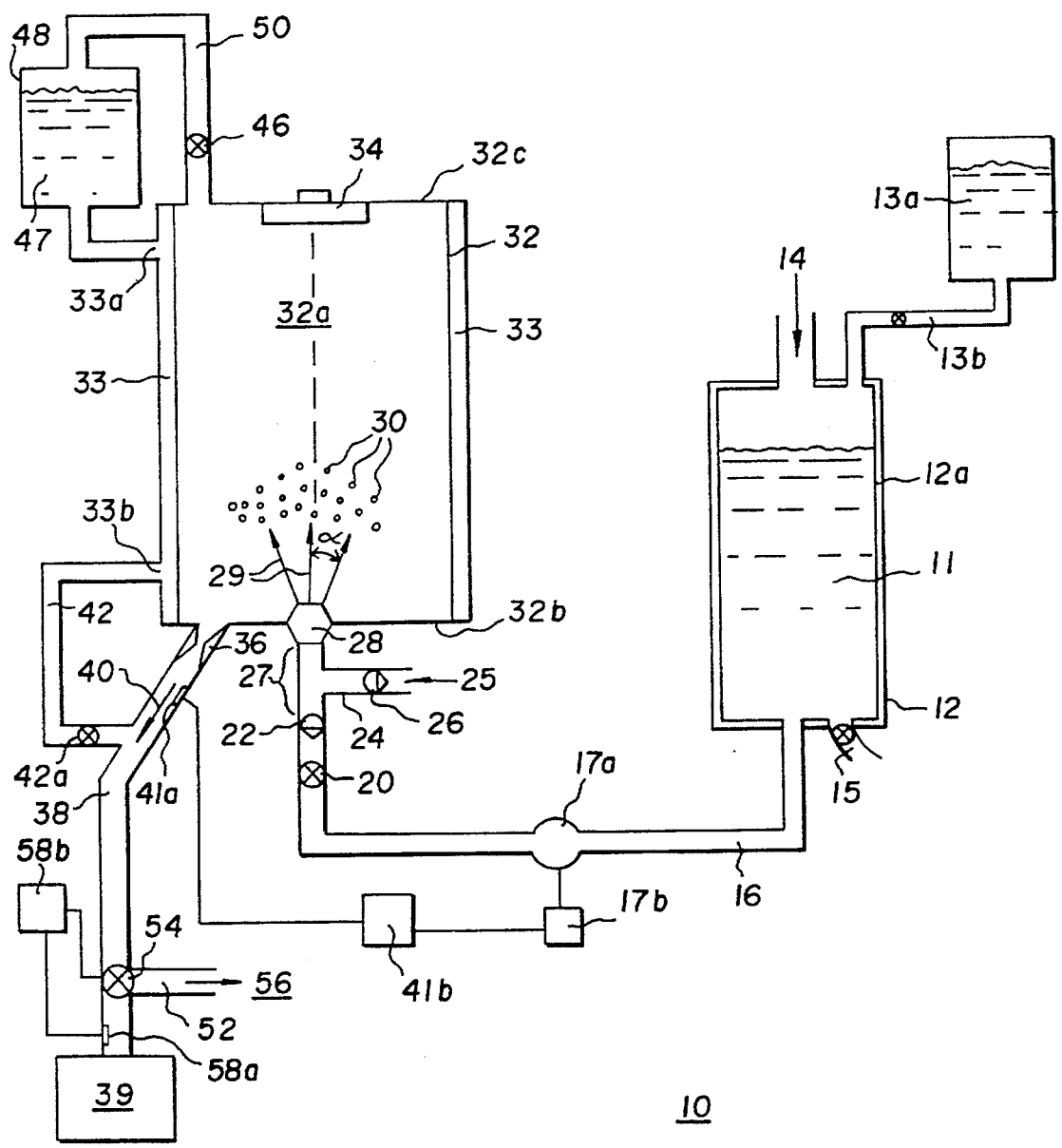
FIG. 1 is a simplified block diagram of a liquid propellant generator according to the invention.

In accordance with a first aspect of the present invention, FIG. 1 shows a steady-state gas generator 10 driven by an oxidizer-containing liquid propellant 11. Liquid propellant 11 may be a broad class of materials generally comprising liquid monopropellants. More specifically, liquid propellants 11 of the present invention comprise hydroxyl ammonium nitrate (HAN) combined with various aliphatic amine-nitrates (AANs). A presently preferred liquid propellant combustible material is an aqueous solution of HAN and triethanol ammonium nitrate (TEAN). The most preferred material used in the present invention is comprised of about 60.79% HAN, about 19.19% TEAN and about 20.02% water, by mass percentage. HAN, with a chemical formula of $N_2H_4O_4$, has a molecular weight of 96 grams per mole and is the oxidizer in liquid propellant 11. TEAN, with a chemical formula of $C_6H_{16}N_2O_6$, has a molecular weight of 212 grams per mole and is the fuel in liquid propellant 11. The water serves as the non-reacting solvent for both compounds. Liquid propellant 11 is a colorless, odorless, completely homogeneous fluid with a mass density of about 1.43 grams/cc, a toxicity comparable to aspirin and corrosivity comparable to lemon juice. Liquid propellant 11 is reasonably energetic, with a mass impetus of about 898 Joules/gram and, at constant volume, burns at a temperature of about 2500° K. With this mass density and mass impetus, liquid propellant 11 has a volumetric impetus of 1284 Joules/cc, which corresponds to a very high volumetric efficient energy source compared to most solid propellants. The balanced stoichiometric reaction is as follows:

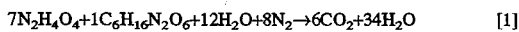

$$7N_2H_4O_4 + 1C_6H_{16}N_2O_6 + 12H_2O + 8N_2 \rightarrow 6CO_2 + 34H_2O \qquad [1]$$

As can be seen from Equation 1, the reaction products: water (as super-heated steam); carbon dioxide and nitrogen gas are all non-toxic gases.

Liquid propellant 11 is held in a storage tank 12, and it should be understood that any containment vessel that holds the liquid propellant 11, and provides compatibility with propellant 11 for long term storage, is within the scope of the present invention. A presently preferred vessel is a tank which has a liner 12a made of a pharmaceutical grade of polyvinylidine fluoride over-wrapped by a composite fiberglass winding; however, many modifications will be known to those skilled in the art. The fiberglass winding allows storage tank 12 to be moderately pressurized, but is designed in a manner so as to rupture when the internal pressure increases beyond a predetermined value. Such rupturing will inhibit premature ignition of any liquid propellant which is still being held in tank 12. Pressurization, for forcing propellant 11 into an enclosed volume 32a of combustion chamber 32, may be accomplished through a variety of mechanisms, for example, a pump 17a or an external inert gas pressure source, both of which are of well known type. A motor 17b, used to drive pump 17a, may be either electrically powered or may be a small turbine driven by gases bled from combustion chamber 32, depending on convenience and system requirements. For a flow rate of 0.1 pounds-mass per second at an injection head pressure of 2000 psia, the required pumping power may be on the order of 0.7 horsepower. Motor 17b may have dimensions on the scale of about 2 inches to about 4 inches. The actual pump mechanism 17a and its housing, coupled to an electric motor 17b, would also be comparable in size. The pump size can vary according to the requirements of generator 10, e.g., longer durations versus higher power demands, and such variations will be known to those skilled in the art.

Filling means, such as an inlet pipe 14, is made for filling tank 12 with propellant 11. A tank of water 13a and connecting pipe 13b is provided to dilute propellant 11 with water—to neutralize it from combustion in an emergency situation. A drain means 15 is provided to remove propellant 11 from tank 12 on an as-needed basis. Also, a connecting means 16 must connect storage tank 12 to combustion chamber 32, and may comprise piping formed of a multitude of materials capable of conveying liquid propellant 11 from storage tank 12 to combustion chamber 32, which materials will be known to those skilled in the art. Furthermore, connecting means 16 may provide valve and other flow regulating mechanisms (described in detail hereinbelow).

Because propellant 11 used in the present invention is a monopropellant, i.e., has its fuel and oxidizer premixed, an injector 28, for spraying the propellant into enclosed volume 32a of combustion chamber 32, may comprise a single element type of spray nozzle—such as might be common to a paint sprayer. Injector 28 enables propellant 11 to be sprayed into enclosed volume 32a, as an axisymmetric cone 29 of uniformly distributed droplets 30 so as to facilitate its homogeneous breakup and burning. The included angle ∝ of axisymmetric cone 29 is approximately 60 degrees and may be varied through known techniques, depending on the intended application for generator 10. The design of injector 28 affords tremendous simplification over any injector means which impinge separate streams of fuel and oxidizer.

As generator 10 is shut-down and its related components cool down, the heat soak-back to the feed-line must be minimized to ensure non-ignition of any propellant 11 remaining in the "dribble volume" 27 in connecting means 16 just prior to injector 28. This is accomplished by incorporating, in connecting means 16, a check valve 22 to ensure that a steady flow of propellant 11 was positively injected into enclosed volume 32a should fluctuations occur in the pressure generated by pressurization means, e.g., pump 17a and motor 17b. Another mechanism to ensure non-ignition of propellant 11 as generator 10 is shut-down comprises a compressed gas valving system 26 to control a flow of an inert gas 25, e.g., nitrogen, through a pipe 24 and into connecting means 16 to clear out dribble volume 27, as well as cool injector 28 through forced convection. There must also be a fast acting on/off valve 20 placed in connection means 16 to control the flow of liquid propellant to enclosed volume 32a.

Once propellant 11 is propelled into enclosed volume 32a, it is ignited by an initiator 34. Initiator 34 may comprise a plurality of different designs and configurations which will be known to those skilled in the art. The simplest approach for initiator 34 is to use a solid propellant squib such as a shot-gun shell. This approach has the advantage of no electrical requirements and no complex mechanical components, but has the disadvantage of necessitating replacement for each restart of generator 10. Another, initiator design includes electrical resistive heating of a semi-conducting element, such as nichrome wire, glow plug, and the like.

An electrical initiator has the advantage of not requiring replacement of any elements and thus allows generator 10 to be repeatedly started and stopped without initiator replacement. For this purpose, a 40 joule, 1500 volt power supply will be sufficient to charge the conducting element. Once the combustion reaction of liquid propellant 11 takes place and develops sufficient chamber pressure, the ignition process will become self-sustaining and initiator 34 may be turned off. Yet another approach for initiation of the combustion reaction may be accomplished by introducing small quantities of a number of highly reactive chemical compounds (such as inhibited red fuming nitric acid and the like) to initiate hypergolic, i.e., spontaneous, combustion with liquid propellant 11. This is not a presently preferred method due to the obvious safety hazards imposed.

Filed concurrently herewith is a patent application Ser. No. 08/453,112 entitled "Initiator for Use In a Liquid Monopropellant Gas Generator", to Mandzy et al., which teaches one presently preferred initiator design. This concurrently filed application is incorporated herein in its entirety by reference. The initiator thereof includes an opening for introducing liquid propellant and a pre-pressurization gas into an igniter chamber; an opening for introducing liquid propellant reaction products into a gas generator; a means for controlling this rate of introduction; and a heater/electrode to vaporize the liquid propellant in the igniter chamber.

Combustion chamber 32 may also have a multitude of configurations which will be known to those skilled in the art. The presently preferred design is a cylindrical combustor where propellant 11 is sprayed in from the center-line of a bottom end 32b, ignited at a top end 32c, and the hot gases produced by the combustion reaction are vented through an off-center outlet nozzle 36 situated next to injector 28 at the bottom 32b of combustion chamber 32. While not wanting to be limited by any specific theory, it is believed that this approach allows for an optimal breakup of the stream of liquid propellant from injector 28 by first enabling the spray to disperse toward the top 32c of combustion chamber 32 (within enclosed volume 32a) and then achieve a subsequent secondary finer droplet generation as those liquid entities strike the hot, relatively dense gases emanating from the combustion of the preceding droplets which were earlier ignited. The combustion of these droplets in turn provide the regenerative mechanism to break-up and burn the droplets of any liquid propellant 11 that follow.

Combustion chamber 32 may be fabricated from a broad class of materials, such as stainless steel and the like, with the only limitation being that combustion chamber 32 must be able to withstand the pressure and temperature requirements of the combustion reaction of liquid propellant 11. To accommodate the previously mentioned mass flow of 0.1 pounds-mass per second, enclosed volume 32a (preferably with dimensions of about 4.5 inches long and 2.0 inches in diameter) will enable a chamber pressure of about 1500 psia at an adiabatic flame temperature of about 2500° K. It should be understood that these dimensions will vary depending on the intended application for generator 10.

Outlet nozzle 36 of generator 10 dispenses the combustion gases, which subsequently travel through piping 38 as "working gases" 40 toward an intended (load 39) purpose. Whereas the combustion of many solid propellants release significant quantities of hydrogen, carbon monoxide, as well as various acids which are explosive, poisonous and corrosive, the liquid propellants used in the present invention burn exceptionally clean—forming just water, nitrogen and carbon dioxide (Eqn. 1 above). The design of the outlet nozzle 36 has a significant impact on the properties of the combustion gases. For example, the combustion gases can be cooled from their adiabatic flame temperature of about 2500° K. down to about 1800° K. via the nearly isentropic expansion of the gases from about 1500 psia to about 250 psia by use of a converging-diverging nozzle 36. Nozzle 36 may comprise a broad class of materials which can withstand the temperature and pressure requirements imposed by the combustion gases, with the presently preferred composition being a copper-beryllium alloy.

Figure 2:
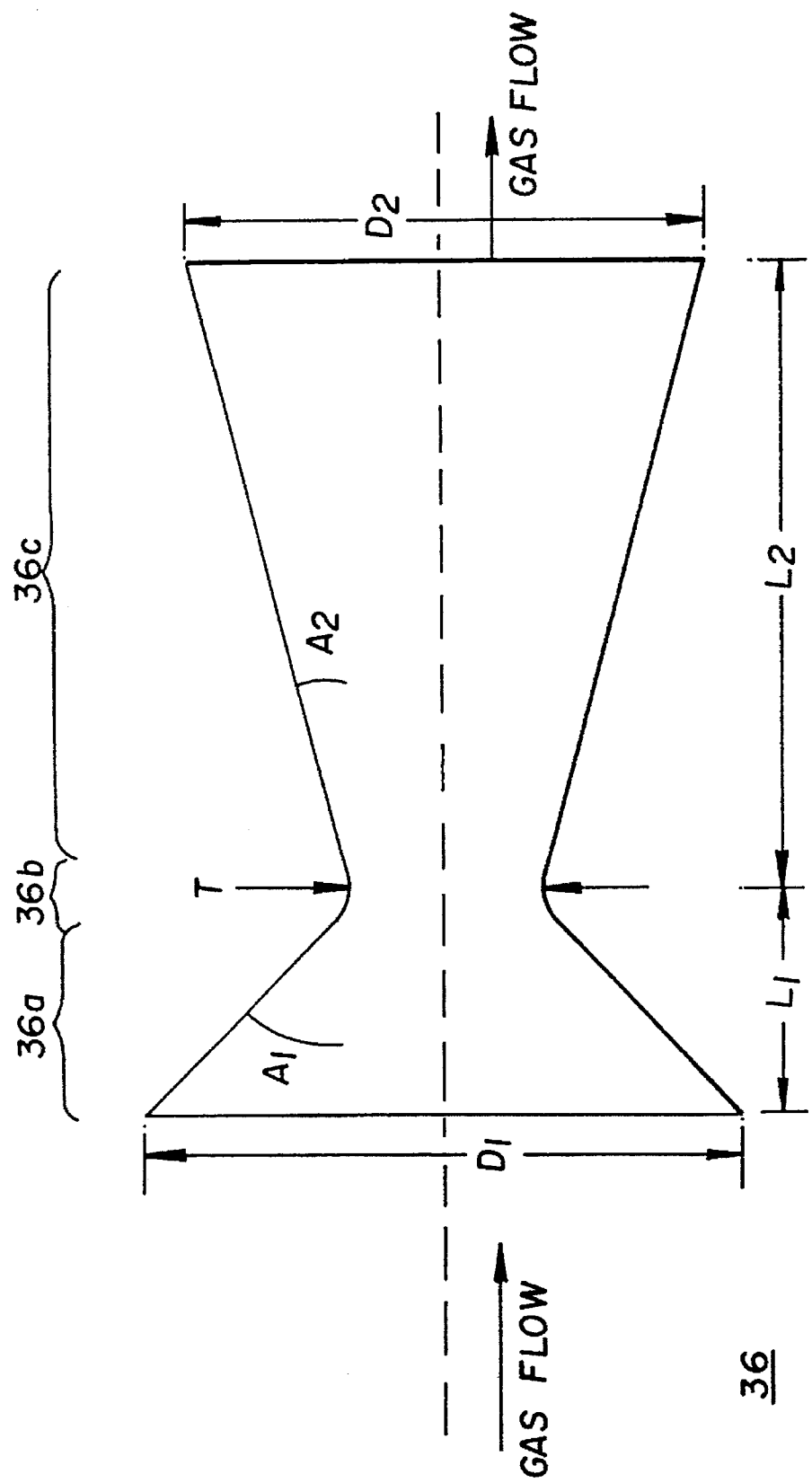
FIG. 2 is a cross-sectional view of a typical converging-diverging outlet nozzle.

FIG. 2 shows a typical design for outlet nozzle 36. Outlet nozzle has three axial sections: an input convergence section 36a; a throat section 36b; and a divergence section 36c. As the combustion gases travel into nozzle 36 they enter the input convergence section 36a and are compressed—thereby transferring the potential energy of the combusted gases into kinetic energy. The input convergence section can vary in design, depending on the intended application of generator 10, and preferably has an inlet diameter $D_1$ of approximately 0.250 inches, an angle $A_1$ of about 45 degrees, and a length $L_1$ of approximately 0.096 inches. The gases next travel through the throat section 36b which preferably has a contour radius having a diameter T of approximately 0.1 inches—and may be varied. The output divergence section may also vary depending on the intended use of generator 10, and preferably has an outlet diameter $D_2$ of approximately 0.440 inches, an angle $A_2$ of about 15 degrees, and a length $L_2$ of about 0.641 inches. This particular geometry will expand the combustion gases in a near-isentropic manner from 1500 psia at the nozzle inlet to about 8.5 psia at the nozzle exit plane; correspondingly, these gases are cooled via this expansion from their 2500° K. flame temperature down to about 1000° K.

Nozzle 36 converts the potential energy of the combustion gas into kinetic energy and produces thrust by raising the gas velocity to supersonic speeds. The thrust created by the expansion of the combustion gases can be beneficial, or a feature that must be worked around, depending on the final application of generator 10. For example, by utilizing gas generator 10 to start a diesel engine, sufficient thrust would be instrumental in overcoming the frictional forces of rotating the crankshaft; yet by utilizing generator 10 to inflate a life raft, such a thrust may have to be dispersed so as to inhibit any tearing of the vessel's fabric.

Also, the temperature of the combustion gases must be considered when selecting the materials for exhaust nozzle 36. For example, if outlet nozzle 36 and its downstream components are properly designed so that the pressure at the exit plane is approximately 250 psia, then the temperature of the working fluid 40 is approximately 1800° K. (which is less than the combustion temperature of diesel fuel). Most materials, however, can not withstand this temperature on a steady-state operating basis without significant, and possibly unacceptable, damage. By steady-state we mean a constant flow of exhaust gases over a period of time, typically exceeding one minute in duration. One method of overcoming this inherent problem is by use of high temperature materials in conjunction with gas cooling techniques. However, these materials can be very expensive and are sometimes difficult to process. A presently preferred material for such high temperature applications is TZM, a common titanium-zirconium-molybdenum alloy. Another method is to ensure the duty cycle interval is relatively short, such that the materials are not exposed to these extreme temperatures for a significant period of time. Steel throats have been operated in rocket motors for durations on the order of one minute at these temperatures without significant damage (without any exterior cooling mechanisms). FIG. 2 shows just one example of how outlet nozzle 36 may be designed. This design will have a tremendous impact on the temperature, pressure, and velocity of the gases exiting nozzle 36, i.e., working gases 40, and thus it should be understood that many modifications may be made to nozzle 36 depending on the final application of generator 10.

Referring again to FIG. 1, generator 10 may be further enhanced by monitoring the working gases 40 and using this information to ensure proper generator operation by controlling the amount of liquid propellant 11 injected into enclosed volume 32a. One method of accomplishing this control circuit is to insert a first sensor 41a in exhaust piping 38 to monitor at least one of the properties (e.g., thrust, pressure, and temperature) of working gas 40. This information is passed to feedback control means 41b where it is analyzed against a set of preselected operating parameters for generator 10. If this comparison finds corrective action is necessary, feedback control means 41b, of well known type, will send a signal to motor 17b (which controls pump 17a) to vary the amount of liquid propellant 11 injected into enclosed volume 32a.

Another method of enhancing generator 10 is to inject an inert cooling liquid 47, such as water (housed in tank 48), into the stream of combusted gases after they travel through nozzle 36. Cooling the combusted gases with water has two significant advantages. First, it maximizes the efficiency of the heat transfer process by having all of the injected water absorb energy from the combusted gases. Second, this injected water 47 (with absorbed energy) generates more steam, i.e., working gas 40, as it undergoes the physical phase change from a liquid to a gas. This additional working gas 40 can be used to either reduce the quantity of propellant 11 burned, or it may increase the quantity of working gas 40 produced from the same amount of propellant 11.

Although it may be accomplished in a variety of means which will be known to those skilled in the art, water 47 is preferably inserted into the stream of combusted gases traveling in exhaust piping 38 just beyond (or downstream from) nozzle 36 by pressurizing tank 48. The pressurized tank forces water 47 into a water jacket 33 surrounding enclosed volume 32a (of combustion chamber 32) through an inlet opening 33a. Water fills water jacket 33, absorbs heat from the walls of combustion chamber 32, and subsequently exits water jacket outlet opening 33b. Water then travels through piping 42, through valve 42a, and is injected into the stream of combusted gases beyond nozzle 36. For example, if 4 pounds of propellant 11 are burned to produce gas at 1500 psia at 2500° K., which is then expanded to 250 psia at 1800° K. through nozzle 36, about 4 pounds-mass of water 47 (approximately 0.5 gallon) would have to be added to the combusted gas stream to cool it to 600° K. Thus, the burning of 4 pound-mass of liquid propellant 11 can produce about 8 pound-mass of gas at the stated conditions. If the temperature of the gas stream were reduced to about 600° K. by water cooling, then a wide range of common materials would be acceptable for all parts downstream of nozzle 36—even at steady-state operation.

Since the combusted gas stream, as it passes nozzle throat 36b, is at a moderate pressure (250 psia), piping 42 may optionally include a simple pump/motor combination (not shown), with the water flow-rate controlled by valve 42a. However, because of the additional cost and complexity of adding a pump, an alternative method of forcing water into exhaust piping 38 includes putting pressure on water tank 48 by routing some of the gases from enclosed volume 32a (of combustion chamber 32) through piping 50. The pressure exerted onto water tank 48 is controlled by valve 46. This is the presently preferred method of cooling the combusted gases, and producing additional working fluid 40 because of its low cost and low complexity.

Finally, once working fluid 40 has performed its intended (load 39) purpose, e.g., turning over a diesel engine, provision may be needed for directing it to the outside environment 56 to prevent excess buildup of heat. There are a plethora of ways to accomplish this goal which will be known to those skilled in the art. One way is to have an exhaust duct 52 directed to the outside environment 56 with a valve 54 placed at the junction of duct 52 and exhaust piping 38. Valve 54 can then direct any unwanted working fluid 40 away from load 39 and toward outside environment 56. Another way is to have separate valves in exhaust duct 52 and in exhaust piping 38 to control the flow of working fluid 40.

In some applications it would be desirable to vary the output of generator 10, and therefore, in accordance with a second aspect of the present invention, a variable-output flow-rate gas generator is provided by measuring the needs of load 39 and adjusting valve 54 to just meet those needs—dumping the excess working fluid 40 toward the outside environment 56. This is accomplished by placing a control feedback loop into exhaust piping 38; the feedback loop having a second sensor 58a placed in exhaust piping 38 downstream from exhaust duct 52 to monitor the flow-rate of working gas 40. This information is compared against the needs of load 39 in electronic control means 58b. If the needs of load 39 change, the flow-output of gas generator 10 may be varied by adjusting valve 54 to dump a greater or lesser portion of working fluid 40 toward the outside environment 56. In a presently preferred design, valve 54 is a servo-controlled valve which may continuously control how much working fluid 40 is directed toward the outside environment 56.

Figure 3:
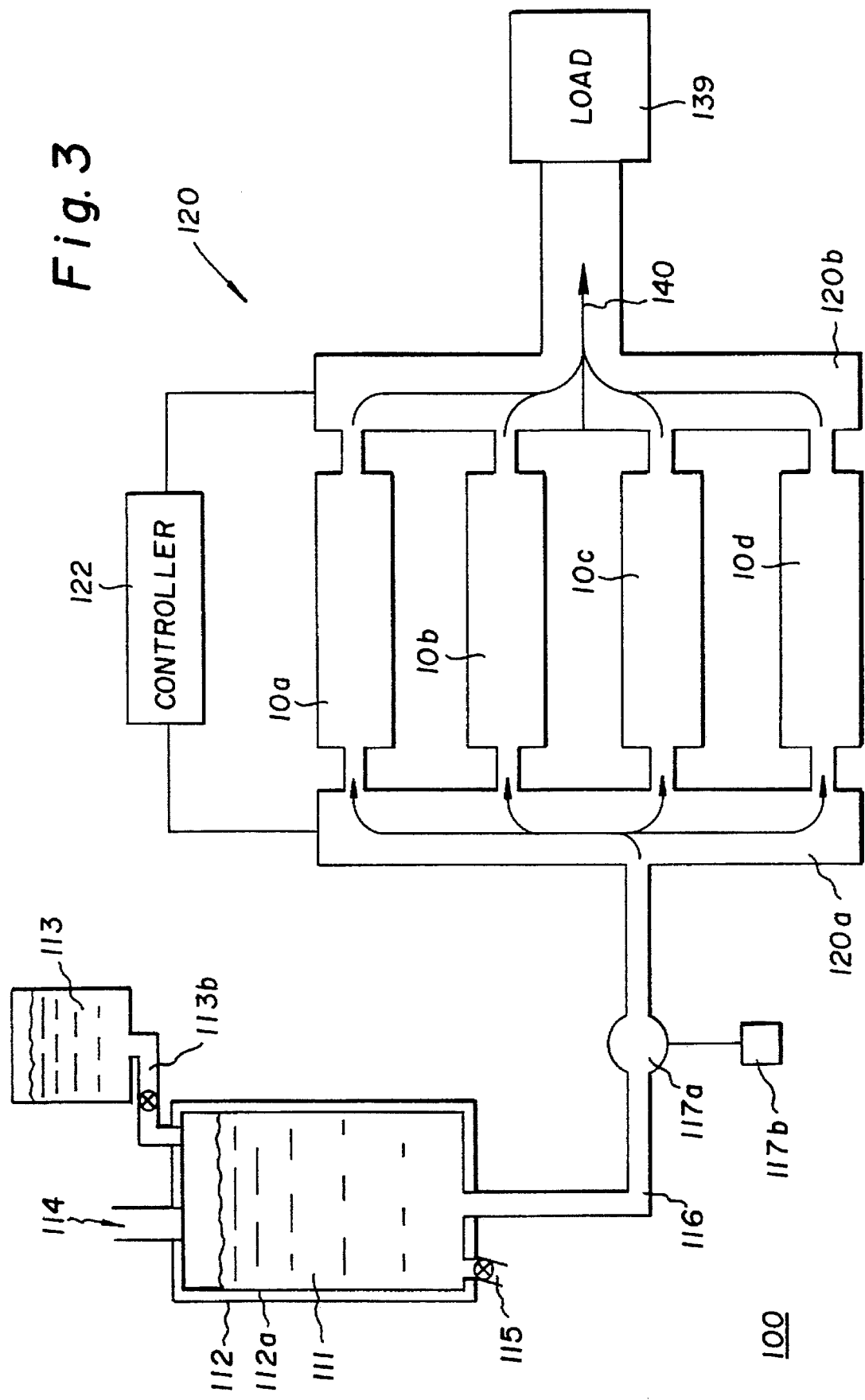
FIG. 3 is a simplified block diagram of a plurality of continuous gas generators connected in parallel to a manifold assembly.

FIG. 3 shows a second embodiment of a variable-output flow-rate gas generator 100. Variable-output generator 100 includes a storage tank 112 holding liquid propellant 111—tank 112 having various subsystems including: a liner 112a; a filling means 114; a draining means 115; and a diluting means consisting of a water tank 113 and connecting means 113b. Storage tank 112 and its associated subsystems are substantially identical to tank 12 and its associated subsystems (12a, 13a, 13b, 14, and 15) described in detail hereinabove. Tank 112 is connected to a first manifold 120a through connecting means 116, the connecting means including a pump 117a and controlling electronics 117b, each of which is substantially identical to 16, 17a and 17b, described in detail hereinabove.

In accordance with a third aspect of the present invention, manifold assembly 120 is connected to a plurality of parallel constant-output flow-rate gas generators (10a through 10d) each of which may be started and stopped to produce a varying output. Connecting means 116 feeds liquid propellant 111 to a first manifold 120a which feeds liquid propellant to the individual constant-output flow-rate generators 10a–10d. The combusted gases of each of the individual generators 10a–10d feed into a second manifold 120b as working fluid 140, which second manifold 120b in turn combines and directs working fluid 140 toward its intended (load 139) purpose. First manifold 120a and second manifold 120b are of well known type, and may be modified depending to the intended application for variable-output gas generator 100. All such types and modification changes should be understood to be within the scope of the present invention. Manifolds 120a and 120b have a controller 122, also of well known type, to control the liquid propellant entering each constant-output flow-rate generator, thereby ensuring a desired output of working fluid 140 directed toward load 139.

Generators 10a–10d may have similar gas-flow outputs or the gas-flow outputs may differ from one another. Thus, variable-output generator 100 can be tailored prior to assembly for a specific gas-flow bandwidth by having a plurality of individual constant flow-rate generators attached to manifolds 120a and 120b. For example, if generators 10a–10d all have identical flow-rates of 0.1 pounds-mass per second, then variable-output gas-flow output generator 100 will be capable of having a flow output bandwidth of between about 0.1 pounds/second and about 0.4 pound-mass per second, adjustable in increments of 0.1 mass per second (by turning each individual generator 10 on and off).

It is preferred, however, to have generator 100 include a plurality of continuous gas generators having different flow outputs. For example, generator 10a may have a set gas-flow output of approximately 0.05 pounds-mass per second, generator 10b may have a set gas-flow output of approximately 0.075 pounds-mass per second, generator 10c may have a set gas-flow output of approximately 0.10 pounds-mass per second, and generator 10d may have a set gas-flow output of approximately 0.15 pounds-mass per second. In this arrangement, variable-output gas-flow generator 100 will be capable of having a flow output bandwidth of between about 0.05 pounds-mass per second and about 0.375 pounds-mass per second, adjustable in varying increments (again by selectively turning each of generator 10a–10d on and off).

EXAMPLE

The following illustrative example is not intended to limit the scope of this invention, but rather to illustrate its application and use. First, a solid propellant igniter 34 is started by electrically initiating a squib. As the pressure builds inside the enclosed volume 32a of combustion chamber 32 from this solid propellant igniter 34, a regulated high-pressure nitrogen gas pressurizes a tank 12 of liquid propellant 11 which is then metered through pipe 16 once the fast-acting control valve 20 is opened. After flowing past an isolation check valve 22, the liquid propellant 11 is injected into the enclosed volume 32a through the spray nozzle 28. As the droplets 30 break up, they burn in the high temperature and pressure environment. When the hot gases head toward the outlet nozzle 36, they facilitate further break-up of the incoming liquid propellant spray 30.

The outlet nozzle 36 via a nearly-isentropic process expands the hot gas from a subsonic to a supersonic flow. This cools the gas and also creates thrust. After the control valve 20 is closed and the liquid propellant pressure drops off, a regulated low-pressure nitrogen gas stream 25 is bled past an isolation check valve 26 through the dribble volume 27 which purges the injector 28 of residual liquid propellant 11, as well as provide cooling via forced convection.

While a presently preferred embodiment of our liquid propellant generator is described herein in some detail, many modifications and variations will become apparent to those skilled in the art; it is our intent to be limited only by the scope of the appending claims, and not by the specific details or instrumentalities present herein by way of description of the preferred embodiments(s).

What is claimed is:

1. A liquid propellant gas generator, comprising:
   a tank for storing a quantity of liquid propellant;
   a combustion chamber having an enclosed volume;
   an injector for spraying a stream of said liquid propellant into said enclosed volume;
   means for connecting said tank to said injector to permit flow of said liquid propellant therebetween;
   means for pressurizing said liquid propellant for forced flow through said injector and into said enclosed volume;
   an ignitor for initiating combustion of said liquid propellant within said enclosed volume to create combustion gases;
   an exhaust nozzle expelling said combustion gases from said enclosed volume to produce a working fluid; and
   feedback means, located downstream from said exhaust nozzle, for monitoring at least one of a temperature, pressure, and thrust of said working fluid, and for controlling said liquid propellant pressurizing means to achieve a substantially constant flow of said working fluid from said exhaust nozzle.

2. The liquid propellant gas generator of claim 1, where said connecting means comprises a pipe capable of conveying pressurized liquid propellant from said tank to said injector and includes an on/off valve.

3. The liquid propellant gas generator of claim 1, where said injector is a single element which sprays an axisymmetric cone of uniformly distributed droplets of said liquid propellant into said enclosed volume.

4. The liquid propellant gas generator of claim 3, further comprising means for introducing an inert gas to cool and purge said injector.

5. The liquid propellant gas generator of claim 4, where said axisymmetric cone has an angle of about 60 degrees.

6. The liquid propellant gas generator of claim 5, where said combustion chamber is cylindrical in shape.

7. The liquid propellant gas generator of claim 1, further comprising means for diluting said tank with a volume of water.

8. The liquid propellant gas generator of claim 1, where said exhaust nozzle comprises a first converging portion, a second throat portion and a third diverging portion.

9. The liquid propellant gas generator of claim 8, where: (a) said first converging portion has an inlet diameter of about 0.250 inches, a length of about 0.096 inches, and a converging angle of about 45 degrees; (b) said second throat portion has a throat diameter of about 0.1 inches; and (c) said third diverging portion has an exit diameter of about 0.440 inches, a length of about 0.641 inches, and a diverging angle of about 15 degrees.

10. The liquid propellant gas generator of claim 1, further comprising exhaust piping means for dispersing said working fluid toward a load.

11. The liquid propellant gas generator of claim 10, where said generator has a variable-output flow-rate by having a valving means disposed in said exhaust piping means for controlling the amount of said working fluid dispersed toward the load.

12. The liquid propellant gas generator of claim 11, where said valving means is a servo-controlled valve included in a feedback circuit means for monitoring a flow-rate of said working fluid.

13. The liquid propellant gas generator of claim 12, further comprising means for direct injection of an inert cooling liquid into said working fluid in said exhaust piping means.

14. The liquid propellant gas generator of claim 13, where said inert cooling liquid is water which absorbs energy from said working fluid and generates additional working fluid.

15. The liquid propellant gas generator of claim 10, further comprising means for direct injection of an inert cooling liquid into said working fluid in said exhaust piping means.

16. The liquid propellant gas generator of claim 15, where said inert cooling liquid is water which absorbs energy from said working fluid and generates additional working fluid.

* * * * *